United States Patent
Ho et al.

(10) Patent No.: US 9,817,196 B2
(45) Date of Patent: Nov. 14, 2017

(54) OPTICAL FILTER SUB-ASSEMBLY CARTRIDGE FOR USE IN A RECEIVER OPTICAL SUBASSEMBLY (ROSA) HOUSING

(71) Applicant: Applied Optoelectronics, Inc., Sugar Land, TX (US)

(72) Inventors: I-Lung Ho, Sugar Land, TX (US); Jun Zheng, Missouri, TX (US); Chong Wang, Stafford, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 14/974,492

(22) Filed: Dec. 18, 2015

(65) Prior Publication Data

US 2017/0176698 A1 Jun. 22, 2017

(51) Int. Cl.
G02B 6/42 (2006.01)
H04B 10/40 (2013.01)
H04B 10/60 (2013.01)

(52) U.S. Cl.
CPC ......... *G02B 6/4215* (2013.01); *G02B 6/4214* (2013.01); *G02B 6/4263* (2013.01); *H04B 10/40* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 5,408,559 A * | 4/1995 | Takahashi | ............ | G02B 6/4246 385/89 |
| 6,142,680 A * | 11/2000 | Kikuchi | ................. | H04B 10/40 385/47 |
| 7,369,776 B2 * | 5/2008 | Masahiko | .............. | H04B 10/40 398/135 |
| 7,556,439 B2 * | 7/2009 | Nakanishi | ............ | G02B 6/4246 385/24 |
| 2007/0122154 A1* | 5/2007 | Nakanishi | ............ | G02B 6/4246 398/85 |
| 2008/0175591 A1* | 7/2008 | Yu | ......................... | G02B 6/2706 398/65 |
| 2010/0061730 A1* | 3/2010 | Seki | ...................... | G02B 6/4246 398/79 |

(Continued)

*Primary Examiner* — Tina Wong
(74) *Attorney, Agent, or Firm* — Grossman Tucker Perreault & Pfleger, PLLC; Norman S. Kinsella

(57) ABSTRACT

An optical sub-assembly cartridge for use in a multi-channel receiver optical sub-assembly (ROSA) is disclosed and includes pre-aligned demultiplexing optics. The optical sub-assembly cartridge may include a plurality of sidewalls which define a cartridge body and at least partially enclose a cavity therein. A sidewall of the cartridge body may include a sidewall opening configured to allow light to enter the cavity. A first optical filter disposed opposite the sidewall opening may receive light entering the cavity and be configured to pass unassociated channel wavelengths out of the cavity while reflecting associated channel wavelengths to a mirror disposed in the cavity. The mirror may then reflect the received channel wavelengths to a second optical filter within or external to the cavity. The second optical filter may emit a narrow spectrum of channel wavelengths to a photodiode package to convert the same to a proportional electrical signal.

20 Claims, 8 Drawing Sheets

(56) References Cited

U.S. PATENT DOCUMENTS

| | | | | |
|---|---|---|---|---|
| 2014/0314422 A1* | 10/2014 | Shao | ............... | H04B 10/40 398/138 |
| 2015/0346433 A1* | 12/2015 | Tamura | ............... | H04B 10/506 398/82 |
| 2016/0004020 A1* | 1/2016 | Shao | ............... | G02B 6/4246 385/24 |

* cited by examiner

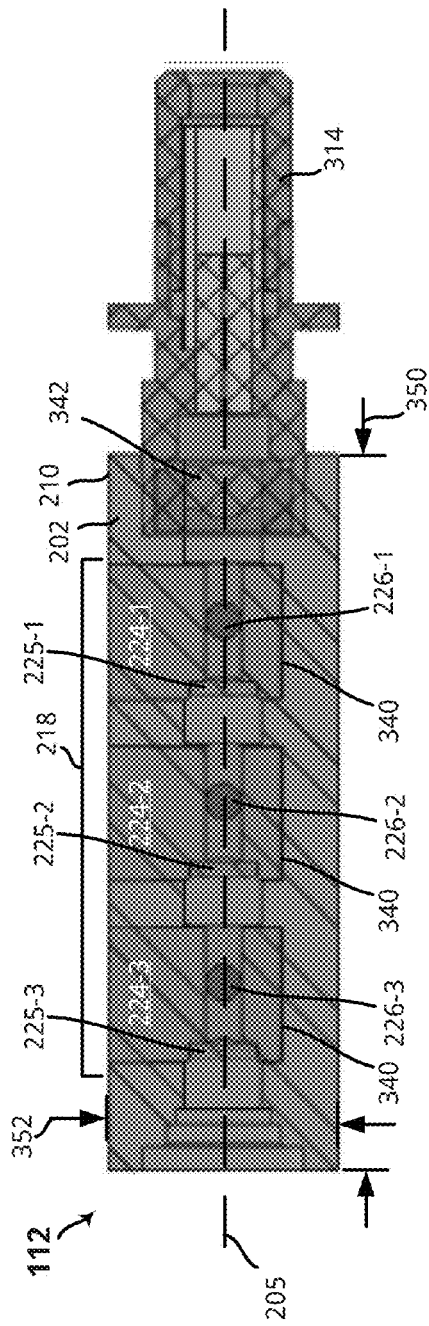
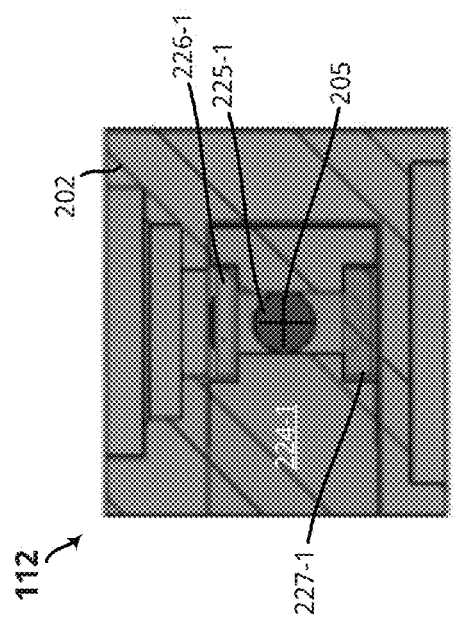
FIG. 2D
FIG. 2E

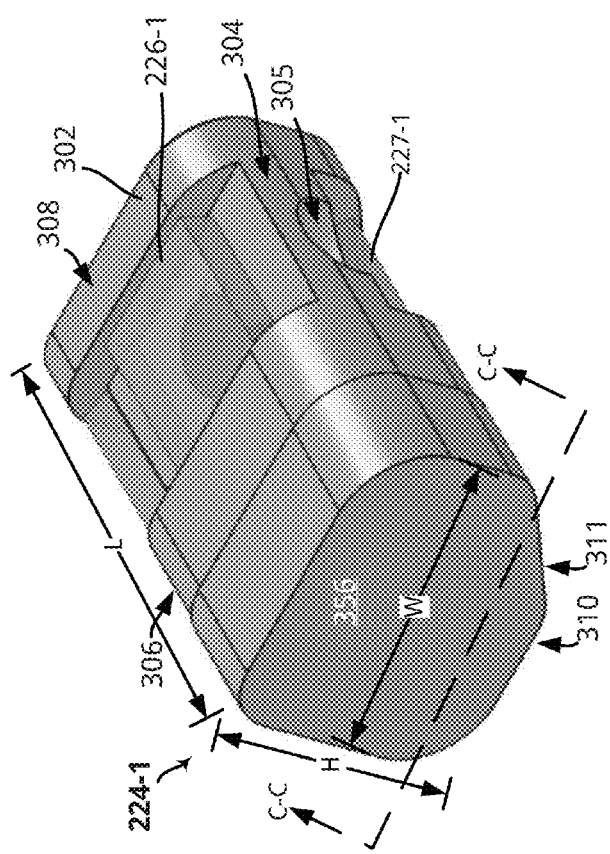
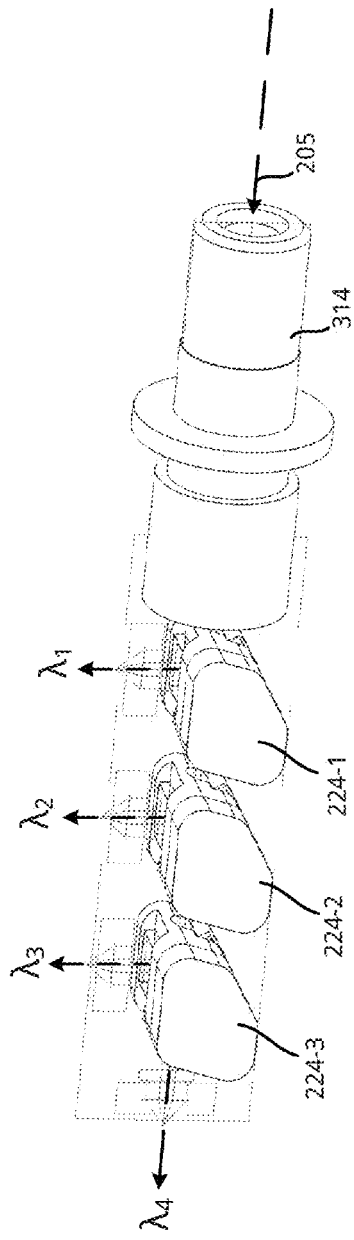
FIG. 3A
FIG. 3B

OPTICAL FILTER SUB-ASSEMBLY CARTRIDGE FOR USE IN A RECEIVER OPTICAL SUBASSEMBLY (ROSA) HOUSING

TECHNICAL FIELD

The present disclosure relates to optical transceiver modules, and more particularly, to an optical sub-assembly cartridge that includes pre-aligned optical components for use in a receiver optical sub-assembly (ROSA).

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. As optical transceiver housings scale down in size, the complexity of designing and manufacturing TOSAs and ROSAs to fit within those constrained housings, without sacrificing channel allocation and transceiver performance, continues to increase and raises numerous non-trivial issues.

BRIEF DESCRIPTION OF THE DRAWINGS

These and other features and advantages will be better understood by reading the following detailed description, taken together with the drawings wherein:

FIG. 2D is a cross-sectional view of the multi-channel ROSA of FIG. 2B taken along the line A-A, in accordance with an embodiment of the present disclosure.

FIG. 2E is another cross-sectional view of the multi-channel ROSA of FIG. 2B taken along the line B-B, in accordance with an embodiment of the present disclosure.

FIG. 3A is a perspective view of an example optical sub-assembly cartridge, in accordance with an embodiment of the present disclosure.

FIG. 3B is a perspective view of a plurality of optical sub-assembly cartridges configured to de-multiplex an optical signal within the ROSA of FIG. 2B without the housing, in accordance with an embodiment of the present disclosure.

DETAILED DESCRIPTION

Figure 1:
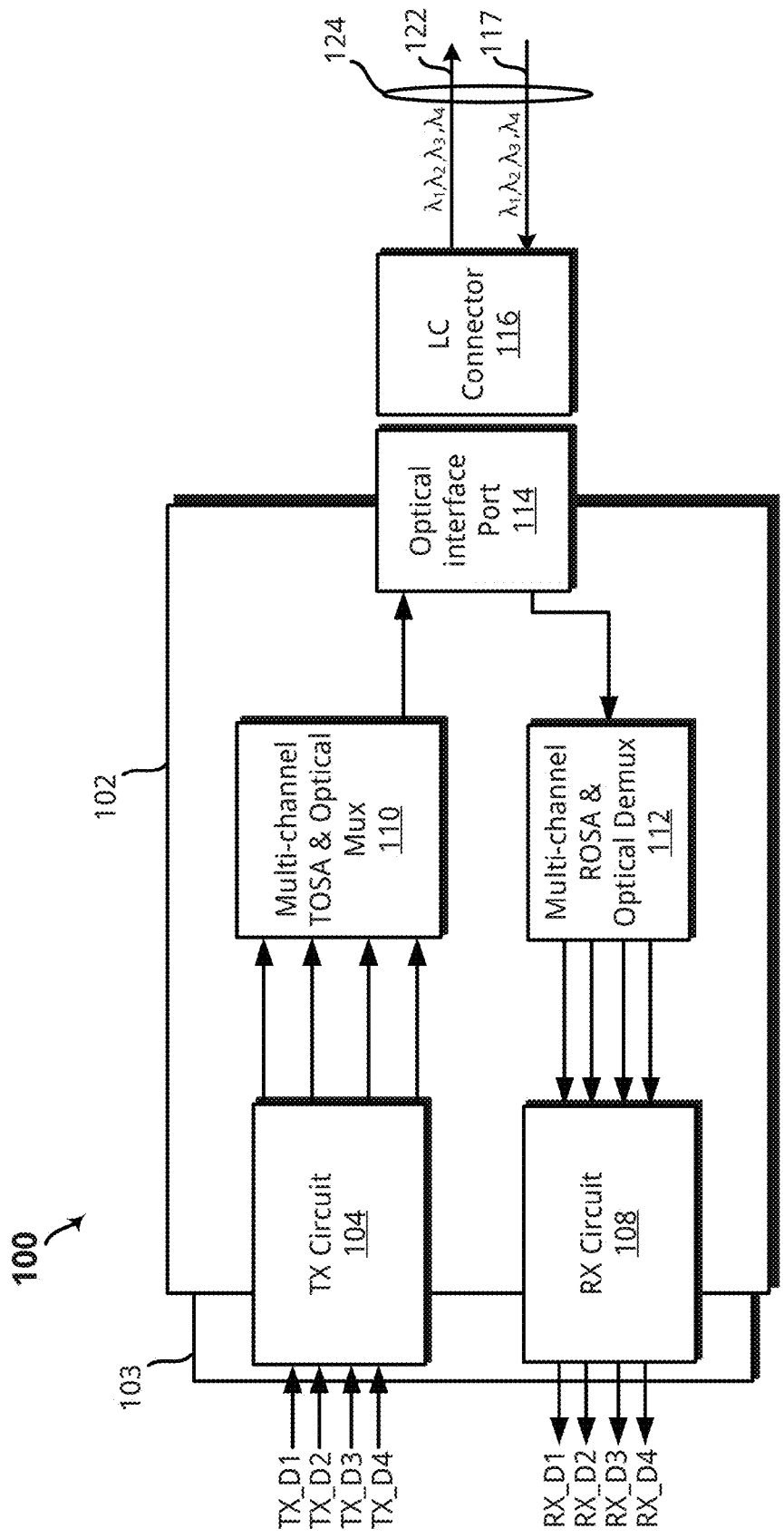
FIG. 1 schematically illustrates an embodiment of an optical transceiver module including a multi-channel transmitter optical sub-assembly (TOSA) and multi-channel receiver optical sub-assembly (ROSA).

An optical sub-assembly cartridge for use in a multi-channel receiver optical sub-assembly (ROSA) is disclosed in accordance with an embodiment, and includes demultiplexing optics pre-aligned to increase optical power, manufacturing yield, and reduce temperature dependence. In particular, the optical sub-assembly cartridge includes a cartridge body having at least first, second, and third sidewalls that extend along a first major axis from a first end to a second end. The first sidewall may include an opening to a cavity within the cartridge body, with the cavity providing an optical path extending from the first sidewall to the second sidewall. A first optical filter fixedly attached to the second sidewall may be configured to receive light via the optical path at an angle relative to normal and reflect associated channel wavelengths internally within the cavity while allowing unassociated channel wavelengths to pass out of the cavity. A mirror disposed within the cavity may receive the reflected associated channel wavelengths and reflect the same to a second optical filter fixedly attached to the third sidewall. A ROSA may include a housing configured with at least one sidewall receptacle configured to receive an optical sub-assembly cartridge and to align a received optical signal with the optical path of the sub-assembly cartridge. The ROSA may further include a photodiode adjacent the second optical filter of the optical sub-assembly cartridge allowing the reflected associated channel wavelengths to be emitted by the second optical filter towards the photodiode. Thus a plurality of sub-assembly cartridges disposed within the ROSA may allow demultiplexing of an optical signal by each sub-assembly cartridge emitting associated channel wavelengths to a respective photodiode while allowing the unassociated channel wavelengths to pass through.

General Overview

As previously discussed, the continued scaling, or shrinking, of optical transceivers and associated components present numerous non-trivial challenges. For example, in a small form-factor (SFF) multi-channel ROSA, multiple optical components must be precisely aligned within particular manufacturing tolerances to ensure that an optical signal is received and de-multiplexed without significant loss. Even a relatively small misalignment (e.g., a few microns) of the optical components within a ROSA can significantly reduce optical power for multiple channel wavelengths. ROSAs also generally exhibit temperature-dependent effects based in part on the expansion and contraction of materials a given ROSA is made of. Each optical component may be fixedly attached to different materials of the ROSA, and thus, may become offset to varying extents based on the thermal characteristics of each different material. The shift/displacement introduced by each material may collectively affect ROSA performance. For example, a 1 degree change in temperature can potentially cause an overall shift of 6 nanometers in the channel wavelengths passed/reflected by the optical components within a given ROSA. Thus temperature-dependence of optical components within a ROSA may limit the range of suitable operating temperatures.

Thus, in accordance with an embodiment, an optical sub-assembly cartridge is disclosed that provides optical components fixedly attached and pre-aligned in a cartridge body within predetermine tolerances. A manufacturing process may form the optical sub-assembly cartridge separate from a ROSA, and later mount/insert the formed optical sub-assembly cartridge in a sidewall receptacle of the ROSA. This may allow precise positioning and testing of optical components without the complexity normally associated with other approaches that fixedly attach and align optical components separately and directly within a ROSA housing. Two or more optical sub-assembly cartridges may be mounted into a ROSA to provide de-multiplexing of multiple different channel wavelengths. Because the optical components within each optical sub-assembly are in an optimal orientation or otherwise substantially pre-aligned, no additional alignment procedures may be required to ensure optical coupling/efficiency.

In more detail, an optical sub-assembly cartridge includes a plurality of sidewalls which define a cartridge body and at least partially enclose a cavity therein. A sidewall of the cartridge body may include a sidewall opening configured to allow light to enter the cavity. The optical sub-assembly cartridge can include optical components configured to, in a sense, "split" the light such that a first portion of channel wavelengths exits the cavity at a first point while a second portion of channel wavelengths exits the cavity a second point, the second point being adjacent a photodiode. Thus the second portion of channel wavelengths may be accurately described as associated or otherwise target channel wavelength(s) that get received and detected by the photodiode. For example, a first optical filter disposed opposite the sidewall opening may receive light entering the cavity and be configured to pass unassociated channel wavelengths out of the cavity while reflecting associated channel wavelengths to a mirror disposed in the cavity. The mirror may then reflect the associated channel wavelengths to a second filter within or external to the cavity. In turn, the second optical filter may emit a narrow spectrum of channel wavelengths (e.g., a single channel wavelength) to the photodiode to convert associated channel wavelengths to a proportional electrical signal.

The first filter may comprise a short-pass filter formed from a transparent material (e.g., glass, plastic, polymers, and so on) with a thin film filter material disposed thereon. In some cases, the thin film filter comprises a WDM filter material. Transparent material, as generally referred to herein, refers to a material that allows at least 80% of incident light to pass through a first surface and be emitted out a second surface opposite the first surface. The short-pass filter may be configured/tuned to pass channel wavelengths greater than an associated (or target) wavelength, and reflect wavelengths less than or equal to the associated channel wavelength. For instance, the short-pass filter may be configured to pass channel wavelengths greater than 1270 nm, while reflecting channel wavelengths 1270 nm and less. In some cases, the short-pass filter may be physically disposed at an angle relative to a light path, or optical path, provided by the optical sub-assembly cartridge. Thus the angle of incidence for light contacting the short-pass filter may be relative to the physical angle of the short-pass filter. For example, the angle of incidence for light contacting the short-pass filter may be about 15 degrees relative to normal when the short-pass filter is physically angled 15 degrees relative to the light path, although other angles are within the scope of this disclosure. Likewise, the mirror may be disposed at an angle relative to the light path such that light received from the short-pass filter is reflected to the second filter. In some cases, the angle of the mirror is about 30 degrees, although other angles are within the scope of this disclosure. Although example scenarios disclosed herein specifically reference a short-pass filter, it should be appreciated that other optical filter arrangements may achieve substantially similar effect and are within the scope of this disclosure.

The second filter may comprise a band-pass filter also formed from a transparent material with a thin film filter material disposed therein. In some cases, the thin film filter material comprises WDM thin filter material. The band-pass filter may be configured/tuned to pass a particular associated or target channel wavelength while blocking (or reflecting) channel wavelengths greater or lesser than the associated channel wavelength. Thus the band-pass filter may be configured to allow a relatively narrow spectrum of channel wavelengths (e.g., a single channel wavelength) to pass. For instance, the band-pass filter may be configured to pass only channel wavelengths of 1270 nm, 1290 nm, 1310 nm or 1330 nm. Other channel wavelengths are within the scope of this disclosure, and this disclosure is not limited in this regard. In addition, although example scenarios disclosed herein specifically reference a band-pass filter, it should be appreciated that other optical filter arrangements may achieve substantially similar effect and are within the scope of this disclosure.

Numerous advantageous provided by the optical sub-assembly cartridge disclosed herein will be apparent in light of this disclosure. For example, manufacturing yields may be increased by ROSAs constructed with optical sub-assembly cartridges as the pre-aligned optics may be within prescribed tolerances, and may obviate the need for complicated alignment processes during ROSA formation. Moreover, the time to manufacture each ROSA may be reduced significantly. In addition, the optical sub-assembly cartridge disclosed herein may form, essentially, a monolithic structure whereby operating temperatures affect each optical component disposed therein generally equally. Thus, the uniform shift/displacement may then cause an equal displacement/shift for each optical component during expansion/contraction which may keep optical components aligned or otherwise positioned such that loss is minimized or otherwise mitigated.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid or course wavelength division multiplexing (CWDM). The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Example Optical Transceiver System

Now turning to FIG. 1, there is an optical transceiver 100 consistent with embodiments of the present disclosure. In more detail, the optical transceiver 100 transmits and receives four (4) channels using four different channel wavelengths ($\lambda_1$, $\lambda_2$, $\lambda_3$, $\lambda_4$) and may be capable of transmission rates of at least about 10 Gbps per channel. In one example, the channel wavelengths $\lambda_1$, $\lambda_2$, $\lambda_3$, $\lambda_1$ may be 1270 nm, 1290 nm, 1310 nm, and 1330 nm, respectively. The optical transceiver 100 may also be capable of transmission distances of 2 km to at least about 10 km. The optical transceiver 100 may be used, for example, in internet data center applications or fiber to the home (FTTH) applications. In an embodiment, the optical transceiver 100 implements the specification SFF-8436 titled "QSFP+ 10 Gbs 4× PLUGGABLE TRANSCEIVER Rev 4.8" (hereinafter QSFP+), published on Oct. 31, 2013 by the Electronic Industries Alliance (EIA).

This embodiment of the optical transceiver 100 includes a multi-channel TOSA 110 for transmitting optical signals on different channel wavelengths, and a multi-channel ROSA 112 for receiving optical signals on different channel wavelengths. As shown, the transceiver housing 102 includes the multi-channel TOSA 110 and the multi-channel ROSA 112. A transmit connecting circuit 104 and a receive connecting circuit 108 provide electrical connections to the multi-channel TOSA 110 and the multi-channel ROSA 112, respectively, within the transceiver housing 102. The transmit connecting circuit 104 and the receive connecting circuit 108 may communicate with external systems via data bus 103. In some cases, data bus 103 is a 38-pin connector that comports with physical connector QSFP standards and data communication protocols.

In any event, the transmit connecting circuit 104 electrically couples to the electronic components in the multi-channel TOSA 110 (e.g., TO can laser packages), and the receive connecting circuit 108 electrically couples to the electronic components (e.g., the photodiode packages) in the multi-channel ROSA 112. The transmit connecting circuit 104 and the receive connecting circuit 108 include at least conductive paths to provide electrical connections, and may also include additional circuitry. The multi-channel TOSA 110 transmits and multiplexes multiple different channel wavelengths, and is coupled to an optical interface port 114. The optical interface port 114 may include an LC connector port, although other connector types are also within the scope of this disclosure.

In cases where the optical interface port 114 comprises a duplex, or bi-directional, LC receptacle, the LC connector receptacle provides optical connections to the multi-channel TOSA 110, and provides optical connections to the multi-channel ROSA 112. The LC connector receptacle may be configured to receive and be coupled to a mating LC connector 116 such that transmit optical fiber 122 of the external fibers 124 optically couples to the multi-channel TOSA 110, and the receive optical fiber 117 of the external fibers 124 optically couples to the multi-channel ROSA 112.

The multi-channel TOSA 110 includes multiple TO can laser packages and optics for producing associated channel wavelengths, and couples the same into the transmit optical fiber 122. In particular, the lasers in the multi-channel TOSA 110 convert electrical data signals (TX_D1 to TX_D4) received via the transmit connecting circuit 104 into modulated optical signals transmitted over transmit optical fiber 122. The lasers may include, for example, distributed feedback (DFB) lasers with diffraction gratings. The multi-channel TOSA 110 may also include monitor photodiodes for monitoring the light emitted by the lasers. The multi-channel TOSA 110 may further include one or more temperature control devices, such as a resistive heater and/or a thermoelectric cooler (TEC), for controlling a temperature of the lasers, for example, to control or stabilize the laser wavelengths.

The multi-channel ROSA 112 includes multiple photodiode packages, and optics such as mirrors and filters for receiving a multiplexed optical signal and de-multiplexing the same into associated channel wavelengths, as discussed in further detail below. The multi-channel ROSA 112 can detect, amplify, and convert such optical signals received via receive optical fiber 117, and can provide the converted optical signals as electrical data signals (RX_D1 to RX_D4) that are output via the receive connecting circuit 108. In some cases, the photodiode packages can include integrated transimpedance amplifiers (TIAs).

This embodiment of the optical transceiver 100 includes 4 channels and may be configured for coarse wavelength division multiplexing (CWDM), although other numbers of channels are possible.

Figure 2A:
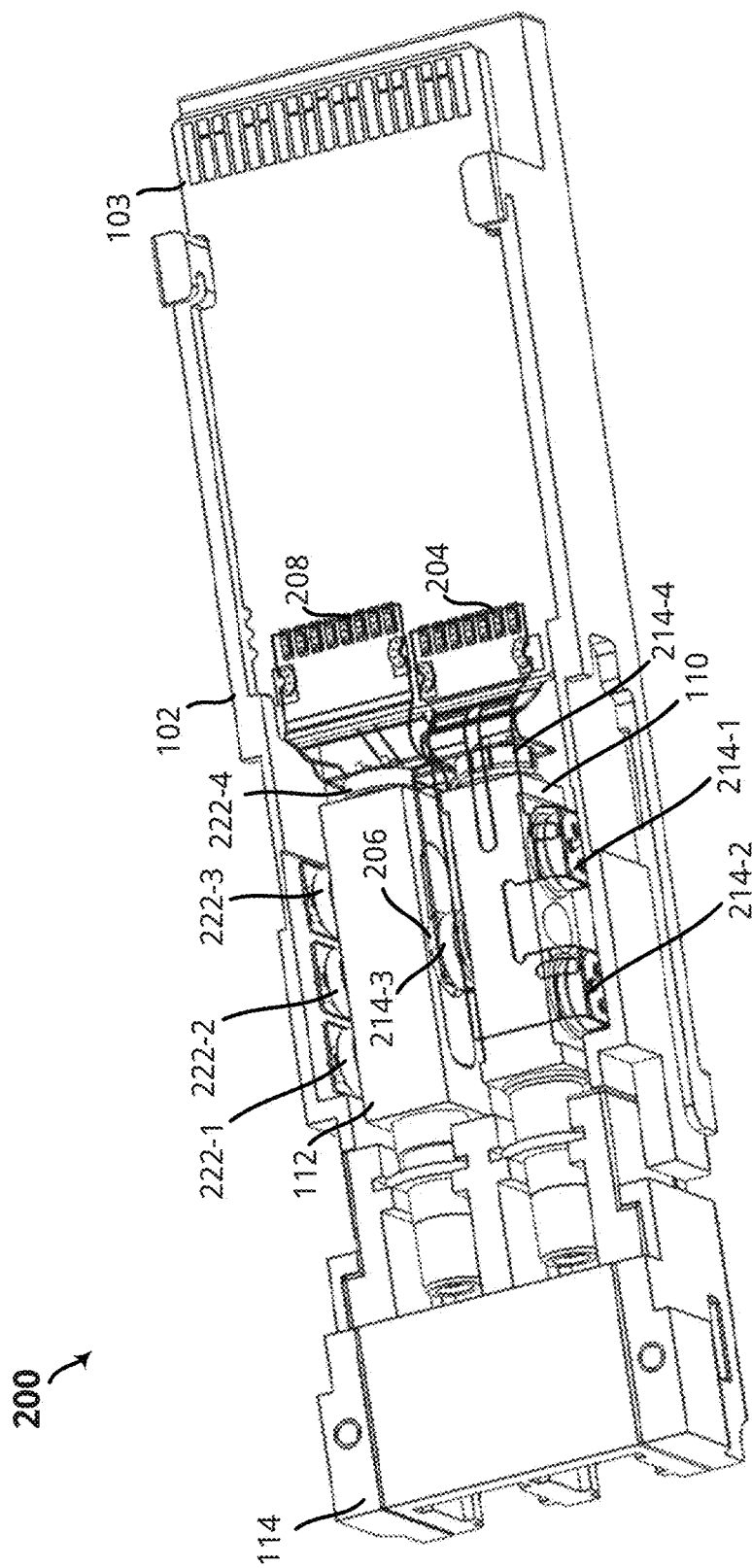
FIG. 2A is a perspective view of an example small form-factor (SFF) pluggable transceiver with a multi-channel TOSA and a multi-channel ROSA, in accordance with an embodiment of the present disclosure.

Referring to FIG. 2A, an example small form-factor (SFF) pluggable optical transceiver 200 with a multi-channel TOSA and a multi-channel ROSA is described and shown in greater detail. The embodiment shown in FIG. 2A is one example of the optical transceiver 100 of FIG. 1 implemented in a small form-factor. For example, the optical transceiver 200 may implement the QSFP+ specification. As shown, the optical transceiver 200 includes a transceiver housing 102, a multi-channel TOSA 110 in one region of the housing 102, and a multi-channel ROSA 112 located in another region of the housing 102. The multi-channel TOSA 110 electrically couples to transmit flexible printed circuits (FPCs) 204 and couples to the optical interface port 114 at an end of the housing 102. The multi-channel ROSA 112 electrically couples to a receive FPC 208, and couples to the optical interface port 114 at the end of the housing 102.

The multi-channel TOSA 110 includes TO can laser packages 214-1 to 214-4, with each containing optical components such as a laser diode. The TO can laser packages 214-1 to 214-4 may provide, for example, output power from 1.85 mW to 2 W, although other output power is within the scope of this disclosure. The TO can laser packages 214-1 to 214-4 may provide a broad spectrum of channel wavelengths, or may be configured to provide a relatively narrow spectrum of channel wavelengths such as a single channel wavelength. In some cases, the TO can laser packages 214-1 to 214-4 provide center wavelengths 375 nm to 1650 nm, for example. In an embodiment, the TO can laser packages 214-1 to 214-4 are Ø3.8 mm, Ø5.6 mm, or Ø9 mm TO cans, although other configurations are also within the scope of this disclosure. For instance, the TO can laser packages can include Ø9.5 mm and TO-46 cans.

The multi-channel ROSA 112 includes photodiode packages 222-1 to 222-4, with each containing optical components such as a photodiode and TIA, for example. In some cases, the photodiodes can provide about −13 dBm sensitivity, or less, for each associated channel wavelength. In an embodiment, the photodiode packages are TO-46 packages, although other package types are also within the scope of this disclosure.

Figure 2B:
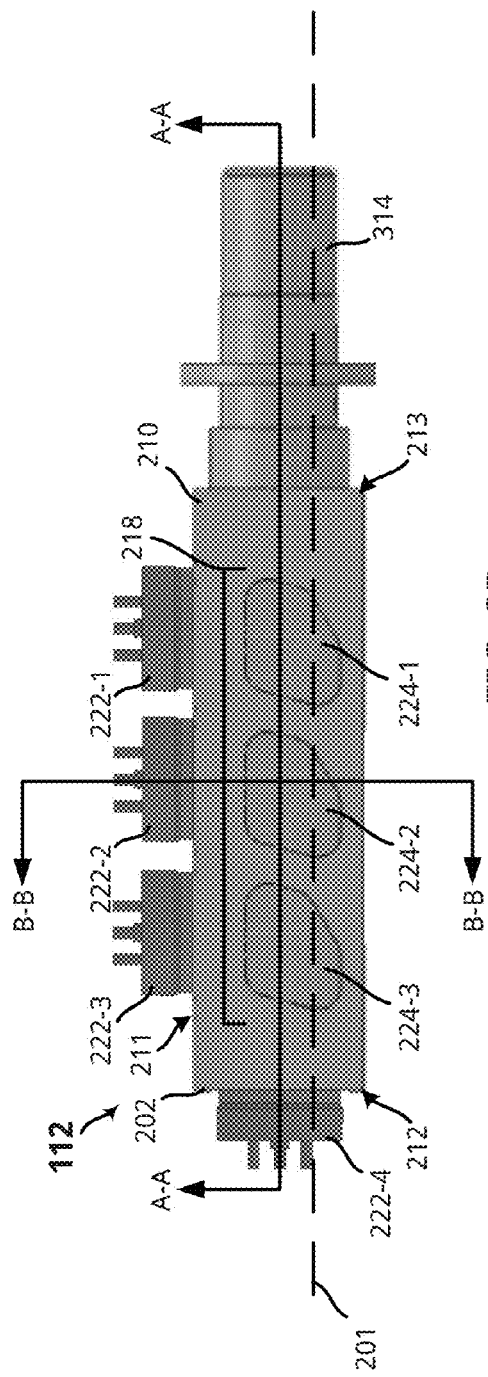
FIG. 2B is a perspective view of the multi-channel ROSA of FIG. 2A including a plurality of optical sub-assembly cartridges, in accordance with an embodiment of the present disclosure.

Referring to FIG. 2B, a perspective view of the multi-channel ROSA 112 is shown, in accordance with an embodiment of the present disclosure. As shown, the multi-channel ROSA 112 includes a housing 202 and a plurality of photodiode packages 222-1 to 222-4 fixedly attached thereto. The housing 202 includes a first sidewall 210 extending along a major axis 201 from a first end 212 to a second end 213. The first sidewall 210 includes a plurality of cartridge receptacles 218 with a plurality of optical sub-assembly cartridges 224-1 to 224-3 disposed therein. An optical coupling receptacle 314 may be fixedly attached to the second end 213 of the housing 202 and be configured to launch an optical signal received from the receive optical fiber 117 into the multi-channel ROSA 112.

Figure 2C:
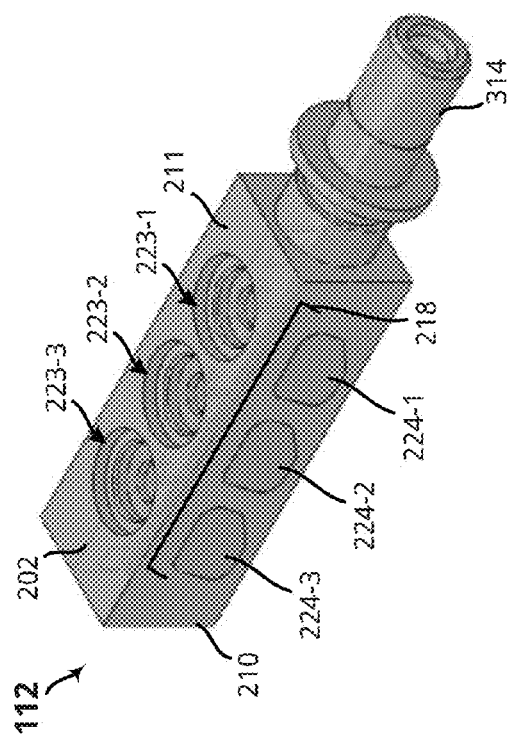
FIG. 2C is another perspective view of the multi-channel ROSA of FIG. 2A without photodiode packages, in accordance with an embodiment of the present disclosure.

FIG. 2C shows another perspective view of the multi-channel ROSA 112, in accordance with an embodiment of the present disclosure. As shown, the second sidewall 211 includes a plurality of sidewall openings 223-1 to 223-3 configured to receive and fixedly attach photodiode packages 222-1 to 222-4. Each of the plurality of cartridge receptacles 218 is positioned adjacent a respective one of the sidewall openings 223-1 to 223-3. As will be discussed further below, this allows the optical sub-assembly cartridges 224-1 to 224-3 to demultiplex an optical signal and provide channel wavelengths to each of the photodiode packages 222-1 to 222-4. Likewise, a third sidewall located at the first end 212 of the housing 202 may provide another sidewall opening (not shown) configured to receive and fixedly attach the photodiode package 222-4.

FIG. 2D shows a cross-sectional view of the multi-channel ROSA 112 taken along the line A-A of FIG. 2B, in accordance with an embodiment of the present disclosure. As shown, each of the plurality of cartridge receptacles 218 includes a cavity 340 defined by inner surfaces of the sidewalls of the housing 202. Each of the cartridge receptacles 218 may be configured to receive one of the optical sub-assembly cartridges 224-1 to 224-3 and fixedly attach the same to the housing 202. Each optical sub-assembly cartridge 224-1 to 224-3 may be fixedly attached to a respective one of the cartridge receptacles 218 by, for example, friction, welding, adhesive, or other suitable attachment methods. As shown, a portion of each optical sub-assembly cartridge 224-1 to 224-3 forms at least a portion of the first sidewall 210 of the ROSA housing 202.

As will be discussed in greater detail below, the cavity 340 aligns the light path 205 with the optics disposed within each optical sub-assembly cartridges (e.g., the short-pass filters 225-1 to 225-3). Photodiodes (not shown) adjacent band-pass filters 226-1 to 226-3, respectively, may receive associated channel wavelengths during demultiplexing. The housing 202 includes a focus lens 342 configured to launch an optical signal into the housing 202 generally along the optical path 205. The housing 202 may have a length 350 of about 7 mm length-wise, and a height 352 of about 2 mm, although other lengths and widths are within the scope of this disclosure.

FIG. 2E shows another cross-sectional view of the multi-channel ROSA 112 taken along the line B-B of FIG. 2B, in accordance with an embodiment of the present disclosure. As shown, the optical path 205 is generally aligned with optics within each optical sub-assembly cartridge, such as the short-pass filter 225-1. As discussed in further detail below, the short-pass filter 225-1 may reflect an associated channel wavelength onto the band-pass filter 226-1 by way of mirror 227-1. On the other hand, the short-pass filter 225-1 may also allow some non-associated channel wavelengths to pass to an adjacent optical sub-assembly cartridge within a ROSA in order to demultiplex different channel wavelengths received in an optical signal.

Now referring to FIG. 3A, a perspective view of the optical sub-assembly cartridge 224-1 is shown in greater detail in accordance with an embodiment of the present disclosure. As shown, the optical sub-assembly cartridge includes a cartridge body 302. The cartridge body 302 may include a plurality of sidewalls including a first sidewall 304, a second sidewall 306, a third sidewall 308, a fourth sidewall 310, and a fifth sidewall 311. However, it should be appreciated that the cartridge body 302 may include varying numbers of sidewalls depending on a desired configuration. Likewise, the cartridge body 302 may have various contours/shapes and is not necessarily limited to the embodiment shown. The cartridge body 302 may include a height H of about 2 mm, a width W of about 2.5 mm and a length of about 4 mm. As shown, the optical components generally occupy one half of the cartridge body 302 while the distal end (the end furthest from the optical components) forms at least a portion of a sidewall of a ROSA housing. The cartridge body 302 may include an end wall disposed at each end, such as end wall 356. Thus, the end wall 356 may be substantially co-planar with an end wall of a ROSA housing after the cartridge body 302 is inserted into a ROSA housing optical sub-assembly cartridge receptacle.

The cartridge body 302 provides a plurality of sidewalls that at least partially enclose a cavity therein. The opening 305 allows an optical signal to be launched into the cartridge body 302, and more particularly, the cavity 406 (FIG. 4). The cartridge body 302 may be formed from a single piece of material (e.g., monolithic structure) or from multiple pieces. In some cases, the cartridge body 302 may be formed from material designed to passively transfer heat away from the optical components within the cartridge body. The cartridge body 302 may comprise, for example, metal such as steel, aluminum, or other appropriate material. For example, the cartridge body 302 may comprise a plastic or polymer, or any other material suitably rigid to support optical components and ROSA operation. The cartridge body 302 may be configured from multiple different materials including one or more types of metallic materials, plastic materials, or a combination thereof. The cartridge body 302 may further include optical components positioned to pass and reflect associated channel wavelengths. As shown, the cartridge body 302 includes a band-pass filter 226-1 and a reflector 227-1 or mirror. The cartridge body 302 may further include a short-pass filter (e.g., short-pass filter 225-1) which is better illustrated in the embodiment shown in FIG. 3C.

FIG. 3B shows a plurality of optical sub-assembly cartridges disposed in a de-multiplexer arrangement within a ROSA but with the housing removed, in accordance with an embodiment of the present disclosure. This de-multiplexer arrangement may be accurately referred to as integrated demultiplexing optics. As shown, each of the optical sub-assembly cartridges 224-1 to 224-3 are disposed in a sequence that allows an optical signal to be received by each optical sub-assembly cartridge, with associated channel wavelengths being reflected orthogonally relative to the light path 205. As will be discussed below, this arrangement can allow channel wavelengths ($\lambda 1$-$\lambda 4$) to be received and converted into an electrical signal by photodiode packages 222-1 to 222-4, respectively.

Figure 3C:
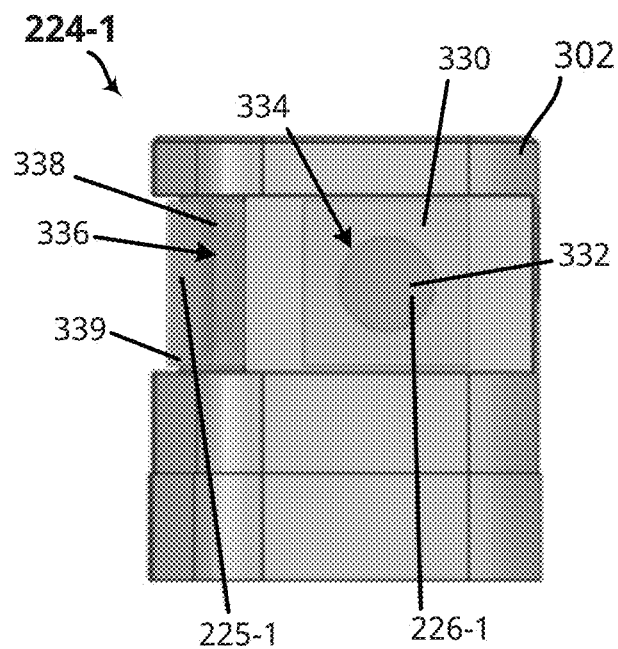
FIG. 3C is top perspective view of the example optical sub-assembly cartridge of FIG. 3A, in accordance with an embodiment of the present disclosure.
Figure 3D:
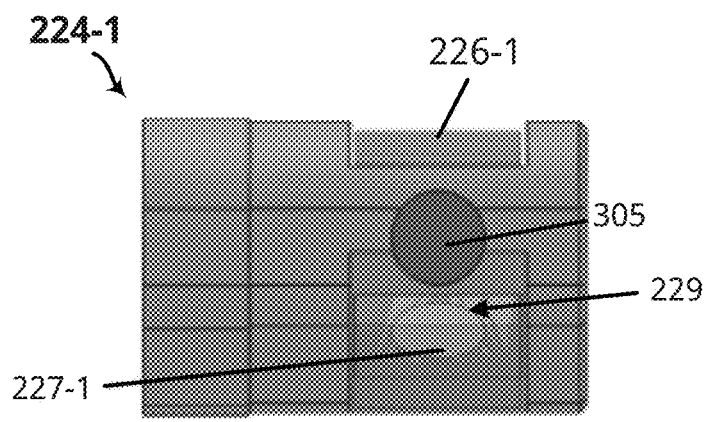
FIG. 3D is a side perspective view of the example optical sub-assembly cartridge of FIG. 3A, in accordance with an embodiment of the present disclosure.
Figure 4:
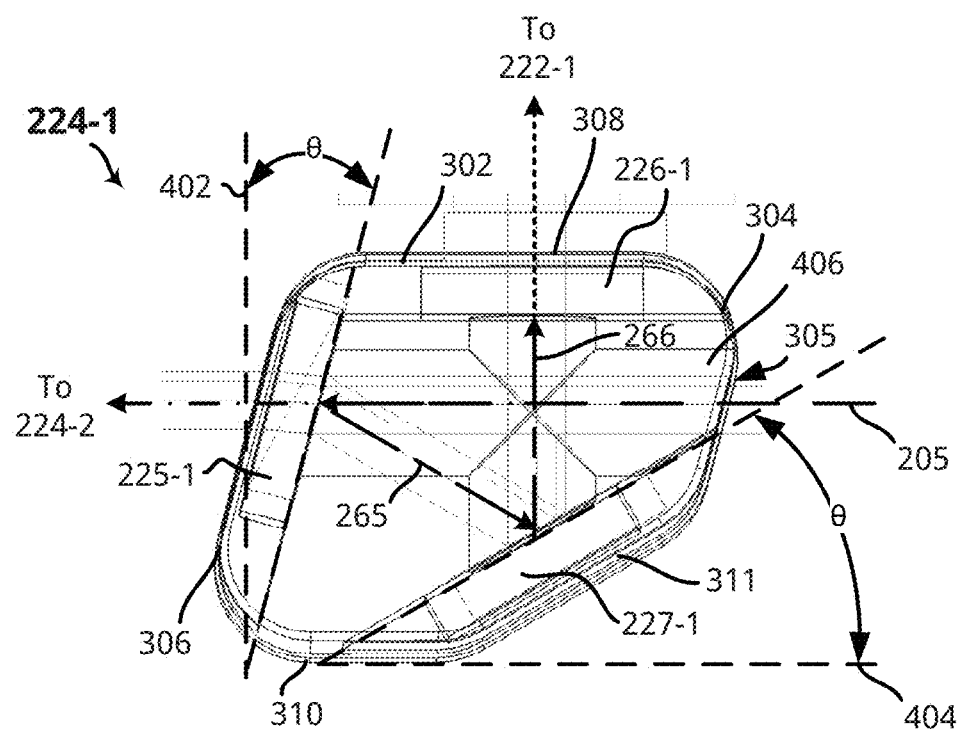
FIG. 4 is a cross-sectional view of the example optical sub-assembly cartridge of FIG. 3A taken along line C-C, in accordance with an embodiment of the present disclosure.

FIGS. 3C and 3D collectively show additional perspective views of the optical sub-assembly cartridge 224-1, in accordance with an embodiment of the present disclosure. FIG. 3C shows a top view of the optical sub-assembly cartridge 224-1 including the band-pass filter 226-1. The band-pass filter 226-1 may comprise a transparent material 330, such as glass, and a thin film WDM filter 332 disposed on the transparent material. In an embodiment, and as shown, the cartridge body 302 includes an opening 334 that allows an optical signal to pass through at least a portion of the band-pass filter 226-1. The short-pass filter 225-1 may be constructed similar to the band-pass filter 226-1, and may comprise a transparent material 339 with a thin-film WDM filter 338 disposed thereon. Likewise, an opening 336 may allow channel wavelengths to contact at least a portion of the short-pass filter 225-1. In FIG. 3D, the mirror 227-1 may comprise a substantially reflective material, or a material with a reflective layer disposed thereon. An opening 229 may allow channel wavelengths reflected by the short-pass filter 225-1 to contact at least a portion of the mirror 227-1 and get reflected to the band-pass filter 226-1.

The thin-film filter of the short-pass filter 225-1 may be configured to allow a relatively broader spectrum of wavelengths to pass than the thin-film filter of the band-pass filter 226-1. This is because the short-pass filter 225-1 may be designed to pass certain wavelengths not associated with the optical sub-assembly cartridge 224-1, and internally reflect associated channel wavelengths through the band-pass filter 226-1, and ultimately to the photodiode package 222-1. This advantageously allows the band-pass filter 226-1 to provide a narrow spectrum of channel wavelengths (e.g., a single channel wavelength) to pass through to a photodiode.

FIG. 4 shows a cross-sectional view of the optical sub-assembly cartridge 224-1 taken along the line C-C of FIG. 3A, in accordance with an embodiment of the present disclosure. As shown, the first sidewall 304, second sidewall 306, third sidewall 308, fourth sidewall 310, and fifth sidewall 311 may be used to mount and align optical components (e.g., short-pass filter 225-1, band-pass filter 226-1 and mirror 227-1) within the optical sub-assembly cartridge 224-1. In particular, the second sidewall 306 may include an angle 402 of about 15 degrees relative to a line extending perpendicular to the fourth sidewall 310. Thus, light encountering the short-pass filter 225-1 may be reflected at about 15 degrees relative to normal. The fifth sidewall 311 may include an angle 404 of about 30 degrees relative to a line extending parallel with the fourth sidewall 310. Thus, light reflected by the short-pass filter 225-1 may be reflected by the mirror 227-1 at about 30 degrees. The third sidewall 308 may be generally horizontal (e.g. about 0 degrees) such that it runs length-wise generally in parallel with the light path 205.

As previously discussed, the optical components within the cartridge body 302 are pre-aligned within manufacturing tolerances such that mitigated or otherwise minimal loss is introduced. In use, light entering opening 305 along the optical path 205 enters the cavity 406, with the cavity being defined by inner surfaces of the sidewalls of the cartridge body 302. The optical path 205 may also be accurately considered a first optical path within the cavity 406. After entering the cavity 406, light may encounter short-pass filter 225-1 along the first optical path. Short-pass filter 225-1 may be configured to pass particular channel wavelengths outside of the cavity 406 (e.g., to adjacent optical sub-assembly cartridge 224-2) while internally reflecting other channel wavelengths within the cavity 406 along the second optical path 265. The internally reflected channel wavelengths then encounter mirror 227-1. In turn, mirror 227-1 then reflects the internally reflected channel wavelengths substantially perpendicular to the light path 205 to the band-pass filter 226-1 along the third optical path 266. The band-pass filter 226-1 then provides a relatively narrow spectrum of channel wavelengths (e.g., a single channel wavelength) to a photodiode, such as the photodiode package 222-1.

Figure 5:
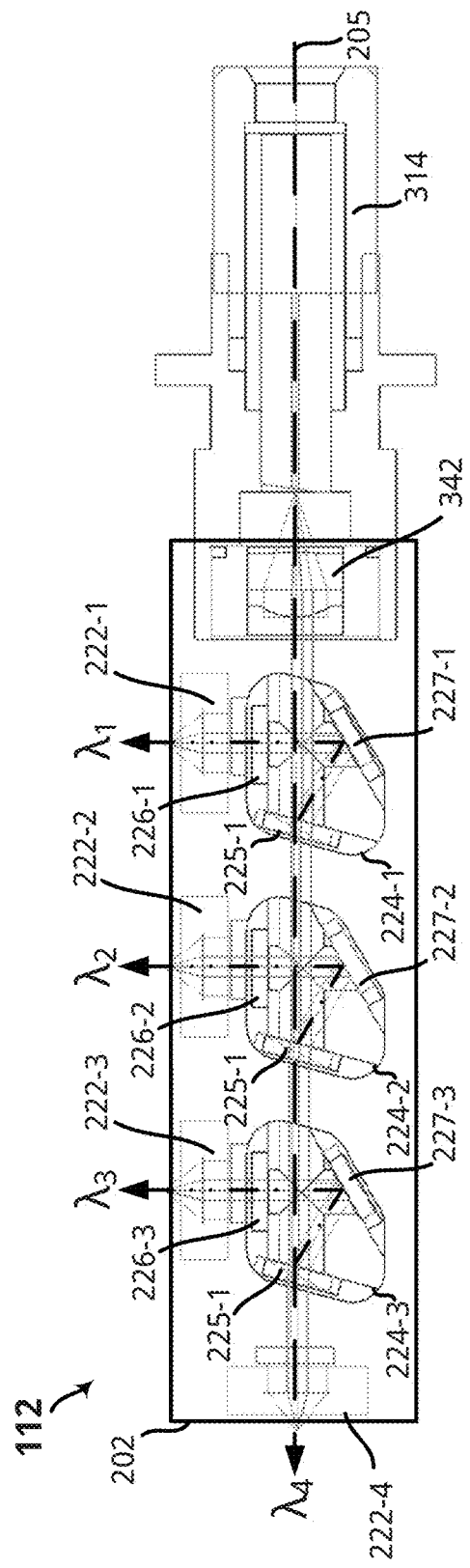
FIG. 5 is another cross-sectional view of the multi-channel ROSA of FIG. 2B taken along the line A-A, in accordance with an embodiment of the present disclosure.

FIG. 5 shows a cross-sectional view of the ROSA 112 of FIG. 3 taken along the line A-A of FIG. 2B, in accordance with an embodiment of the present disclosure. As shown, the housing 202 provides a light path 205 that extends through optical components within each of optical sub-assembly cartridges 224-1 to 224-3. The optical sub-assembly cartridges 224-1 to 224-3 may be configured to pass and reflect laser light at associated channel wavelengths. This combination of filters/mirrors provided by the optical sub-assembly cartridges 224-1 to 224-3 may collectively be described as integrated de-multiplexing optics, and can separate different channel wavelengths provided in an optical signal. De-multiplexing channel wavelengths using this configuration will now be discussed in the context of a four (4) channel TOSA, such as shown in FIG. 5.

The multi-channel ROSA 112 receives an optical signal through, for example, the receive optical fiber 117, with that optical signal having at least four (4) different channel wavelengths ($\lambda 1$, $\lambda 2$, $\lambda 3$, $\lambda 4$). In some cases, the channel wavelengths $\lambda 1$, $\lambda 2$, $\lambda 3$, $\lambda 4$ correspond with 1270 nm, 1290 nm, 1310 nm, and 1330 nm wavelengths, respectively, although other channel wavelengths are also within the scope of this disclosure. A multi-channel TOSA in another transceiver (not shown) coupled to the external fibers 124 may provide an optical signal with these channel wavelengths. In any event, the photodiode packages 222-1 to 222-4 may be associated with a respective channel wavelength. Note that the photodiode packages 222-1 to 222-4 are represented in a simplified block form merely for clarity and practicality.

The filters and mirrors along light path 205 can separate each individual channel wavelength and provide those separated channel wavelengths to an associated one of photodiode packages 222-1 to 222-4. For example, the focus lens 342 may launch an optical signal into the optical sub-assembly cartridge 224-1. The short-pass filter 225-1 of the optical sub-assembly cartridge 224-1 may allow channel wavelengths greater than 1270 nm to be passed, while reflecting channel wavelengths less than 1270 nm on to the band-pass filter 226-1 by way of the mirror 227-1. In turn, the band-pass filter may be configured to pass a relatively narrow spectrum of channel wavelengths (e.g., one channel wavelength) to the photodiode package 222-1. In similar fashion, the optical sub-assembly cartridge 224-2 may be configured to reflect channel wavelength $\lambda 2$ (e.g., 1290 nm) onto photodiode package 222-2 while passing the remaining channel wavelengths ($\lambda 3$-$\lambda 4$). The optical sub-assembly 224-3 may then reflect channel wavelength $\lambda 3$ (e.g., 1310 nm) to the photodiode package 222-3, and pass channel wavelength $\lambda 4$ (e.g., 1330 nm) to the photodiode package 222-4.

As should be appreciated, the multi-channel ROSA 112 may include more or fewer channels (e.g., 2, 4, 8, and so on) and is not necessarily limited to the four (4) shown in FIG. 5.

The multi-channel ROSA 112 may be formed as one piece or as multiple pieces attached together. Although the illustrated embodiments show the multi-channel ROSA 112 with a particular shape, other shapes and configurations are also possible. In other embodiments, for example, the housing 202 may be generally cylindrical.

Further Example Embodiments

In accordance with an aspect of the present disclosure a multi-channel receiver optical sub-assembly (ROSA) is disclosed. The multi-channel ROSA comprising an optical sub-assembly cartridge comprising a cartridge body including at least first and second sidewalls on opposite sides of the cartridge body and extending along a first major axis from a first end to a second end and forming a cavity by an inner surface therein, the first sidewall having an opening configured to allow light to pass into the cavity, a first optical filter on the second sidewall configured to receive the light at a first angle of incidence relative to normal and selectively pass unassociated channel wavelengths out of the cavity, and to reflect an associated channel wavelength within the cavity at a second angle, and a mirror disposed within the cavity configured to receive the associated channel wavelength and reflect the associated channel wavelength, a second optical filter configured to receive the reflected associated channel wavelength, a ROSA housing including at least first and second sidewalls on opposite sides of the ROSA housing and extending along a second major axis from a first end to a second end and forming a compartment defined by an inner surface therein, and wherein the first sidewall has at least one optical sub-assembly cartridge receptacle configured to receive the optical sub-assembly cartridge.

In one aspect, the first angle of incidence is based on a physical angle of the first optical filter, and wherein the physical angle of the first optical filter is about 15 degrees relative to a line drawn perpendicular to the first major axis.

In one aspect, the second optical filter is disposed substantially in parallel length-wise with the first major axis. In one aspect, the mirror is angled at about 30 degrees relative to the first major axis.

In one aspect, the first optical filter comprises a transparent material having a thin-film WDM filter disposed thereon.

In one aspect, the first optical filter comprises a short-pass filter configured to pass wavelengths greater than the associated channel wavelength, and to reflect channel wavelengths greater than or equal to the associated channel wavelength.

In one aspect, the second optical filter comprises a band-pass filter configured to pass a narrow spectrum of channel wavelengths such that substantially only a single channel wavelength is passed out of the cavity by the second optical filter.

In one aspect, the mirror reflects the associated channel wavelength substantially perpendicular to the first major axis.

In one aspect, the cavity provides a first optical path extending generally along the first major axis from the opening to the first optical filter, a second optical path extending from the first optical filter to the mirror, and a third optical path extending from the mirror to the second optical filter.

In one aspect, the ROSA housing includes an optical path that extends substantially along the second major axis, and wherein the ROSA is configured to align the optical path of the ROSA housing with the opening of the cartridge body.

In one aspect, the ROSA housing provides at least one sidewall opening configured to receive and fixedly attach to a photodiode package, the at least one sidewall opening aligned with the at least one optical sub-assembly cartridge receptacle such that an optical sub-assembly cartridge disposed therein emits the associated channel wavelength from the second optical filter to a photodiode within the photodiode package.

In one aspect, at least one sidewall of the ROSA housing is formed at least in part by a sidewall of the optical sub-assembly cartridge disposed within the at least one optical sub-assembly cartridge receptacle.

In one aspect, the second end of the ROSA housing includes an optical coupling receptacle configured to optically couple a signal having multiple different channel wavelengths to a receive optical fiber.

According to another aspect of the present disclosure, an optical transceiver module is disclosed. The optical transceiver module comprising a transceiver housing, a multi-channel receiver optical sub-assembly (ROSA) located in the transceiver housing and including a ROSA housing having a plurality of optical sub-assembly cartridge receptacles with respective optical sub-assembly cartridges disposed therein, each optical sub-assembly cartridge comprising a cartridge body including a plurality of sidewalls at least partially enclosing a cavity therein, the cavity providing an optical path from a first end to a second end of the cartridge body, and wherein the cartridge body includes optical components configured to receive light via the optical path and pass unassociated channel wavelengths out of the cavity to an adjacent optical sub-assembly cartridge, and provide an associated channel wavelength to a photodiode package fixedly attached to the ROSA housing, a multi-channel transmitter optical assembly (TOSA) including at least one TO can laser package located in the transceiver housing for transmitting optical signals at different channel wavelengths.

In one aspect, the ROSA provides an optical path extending from a first end of the ROSA housing to a second end of the housing, and wherein the optical path of each optical sub-assembly cartridge is aligned with the optical path provided by the ROSA.

In one aspect, the optical components within each optical sub-assembly cartridge includes a first optical filter configured to receive light via the optical path provided by the cavity of the cartridge body, and wherein the first optical filter is further configured to pass the unassociated channel wavelengths out of the cavity while providing the associated channel wavelength to a second optical filter by way of a mirror disposed within the cavity.

In one aspect, the first optical filter comprises a short-pass filter, and wherein the second optical filter comprises a band-pass filter.

In one aspect, the optical components include at least one optical filter, the at least one optical filter comprising a transparent material with a thin-film WDM filter disposed thereon.

In one aspect, the optical components are fixedly attached to respective sidewalls, and wherein each optical component is angled relative to the optical path based on a physical angle of each respective sidewall.

In one aspect, the transceiver is a Quad Small Form-factor Pluggable (QSFP) transceiver module and the ROSA is configured to receive at four different channel wavelengths at transmission rates of at least about 10 Gbps per channel.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A multi-channel receiver optical sub-assembly (ROSA) comprising:
   an optical sub-assembly cartridge comprising:
   a cartridge body including at least first and second sidewalls on opposite sides of the cartridge body and extending along a first major axis from a first end to a second end and forming a cavity by an inner surface therein, the first sidewall having an opening configured to allow light to pass into the cavity;
   a first optical filter on the second sidewall configured to receive the light at a first angle of incidence relative to normal and selectively pass unassociated channel wavelengths out of the cavity, and to reflect an associated channel wavelength within the cavity at a second angle;
a mirror disposed within the cavity configured to receive the associated channel wavelength and reflect the associated channel wavelength; and
a second optical filter configured to receive the reflected associated channel wavelength;
a ROSA housing including at least first and second sidewalls on opposite sides of the ROSA housing and extending along a second major axis from a first end to a second end and forming a compartment defined by an inner surface therein, and wherein the first sidewall has at least one optical sub-assembly cartridge receptacle configured to receive the optical sub-assembly cartridge.

2. The ROSA of claim 1, wherein the first angle of incidence is based on a physical angle of the first optical filter, and wherein the physical angle of the first optical filter is about 15 degrees relative to a line drawn perpendicular to the first major axis.

3. The ROSA of claim 1, wherein the second optical filter is disposed substantially in parallel length-wise with the first major axis.

4. The ROSA of claim 1, wherein the mirror is angled at about 30 degrees relative to the first major axis.

5. The ROSA of claim 1, wherein the first optical filter comprises a transparent material having a thin-film WDM filter disposed thereon.

6. The ROSA of claim 1, wherein the first optical filter comprises a short-pass filter configured to pass wavelengths greater than the associated channel wavelength, and to reflect channel wavelengths greater than or equal to the associated channel wavelength.

7. The ROSA of claim 1, wherein the second optical filter comprises a band-pass filter configured to pass a narrow spectrum of channel wavelengths such that substantially only a single channel wavelength is passed out of the cavity by the second optical filter.

8. The ROSA of claim 1, wherein the mirror reflects the associated channel wavelength substantially perpendicular to the first major axis.

9. The ROSA of claim 1, wherein the cavity provides a first optical path extending generally along the first major axis from the opening to the first optical filter, a second optical path extending from the first optical filter to the mirror, and a third optical path extending from the mirror to the second optical filter.

10. The ROSA of claim 1, wherein the ROSA housing includes an optical path that extends substantially along the second major axis, and wherein the ROSA is configured to align the optical path of the ROSA housing with the opening of the cartridge body.

11. The ROSA of claim 1, wherein the ROSA housing provides at least one sidewall opening configured to receive and fixedly attach to a photodiode package, the at least one sidewall opening aligned with the at least one optical sub-assembly cartridge receptacle such that an optical sub-assembly cartridge disposed therein emits the associated channel wavelength from the second optical filter to a photodiode within the photodiode package.

12. An optical transceiver module comprising:
a transceiver housing;
a multi-channel receiver optical sub-assembly (ROSA) located in the transceiver housing and including a ROSA housing having a plurality of optical sub-assembly cartridge receptacles with respective optical sub-assembly cartridges disposed therein, each optical sub-assembly cartridge comprising:
a cartridge body including a plurality of sidewalls at least partially enclosing a cavity therein, the cavity providing an optical path from a first end to a second end of the cartridge body; and
wherein the cavity includes a first optical filter to receive light via the optical path and reflect an associated channel wavelength towards the cavity and pass unassociated channel wavelengths out of the cavity to an adjacent optical sub-assembly cartridge, and a second optical filter to receive the reflected associated channel wavelength and allow the reflected associated channel wavelength to pass through the second optical filter to a photodiode package;
a multi-channel transmitter optical assembly (TOSA) including at least one TO can laser package located in the transceiver housing for transmitting optical signals at different channel wavelengths.

13. The optical transceiver of claim 12, wherein the ROSA provides an optical path extending from a first end of the ROSA housing to a second end of the housing, and wherein the optical path of each optical sub-assembly cartridge is aligned with the optical path provided by the ROSA.

14. The optical transceiver of claim 12, further comprising a mirror disposed in the cavity, and wherein the first optical filter is further configured provide the associated channel wavelength to the second optical filter by way of the mirror.

15. The optical transceiver of claim 12, wherein the first optical filter comprises a short-pass filter, and wherein the second optical filter comprises a band-pass filter.

16. The optical transceiver of claim 12, wherein the first optical filter and/or the second optical filter comprises a thin-film filter.

17. The optical transceiver of claim 12, wherein the transceiver is a Quad Small Form-factor Pluggable (QSFP) transceiver module and the ROSA is configured to receive at four different channel wavelengths at transmission rates of at least about 10 Gbps per channel.

18. An optical sub-assembly cartridge for coupling into an optical subassembly housing, the optical sub-assembly cartridge comprising:
a cartridge body formed by at least first and second sidewalls, the first and second sidewalls defining a cavity therebetween, and wherein the first sidewall includes an opening configured to allow laser light to pass into the cavity;
a first optical filter disposed in the cavity to receive the laser light entering the cavity and reflect an associated channel wavelength towards the cavity; and
a second optical filter disposed in the cavity and configured to receive the reflected associated channel wavelength and allow the reflected associated channel wavelength to pass through the second optical filter.

19. The optical sub-assembly cartridge of claim 18, wherein the first optical filter selectively passes unassociated channel wavelengths out of the cavity.

20. The optical sub-assembly cartridge of claim 19, further comprising a mirror disposed within the cavity to receive the associated channel wavelength reflected from the first optical filter and reflect the associated channel wavelength towards the second optical filter.

* * * * *